Patented Nov. 4, 1952

2,616,860

UNITED STATES PATENT OFFICE 2,616,860

REINFORCING SYNTHETIC RUBBER

William H. Leukhardt, Jr., Waterbury, and James W. Adams, Oxford, Conn., assignors to United States Rubber Company, New York, N. Y., a corporation of New Jersey No Drawing. Application September 6, 1951, Serial No. 245,422

8 Claims. (Cl. 260—8)

This invention relates to the reinforcing of synthetic rubber with hydrated silica.

Finely divided hydrated silica may be milled into synthetic rubber to prepare reinforced, light colored vulcanizates. Excessive milling of the rubber stocks during the dry milling operations reduces the reinforcing powers of the silica pigment. Therefore, it has been considered desirable to incorporate the hydrated silica in the form of an aqueous slurry in the synthetic rubber latex before coagulation so as to form directly the synthetic rubber-hydrated silica mix that could be processed with a minimum amount of mastication. Hydrated silica can be readily wet with water, for which reason no wetting agents are required to prepare aqueous slurries. However, hydrated silica slurried in this manner settles out rapidly to produce cakes that are difficult to redisperse. The use of conventional wetting and dispersing agents, such as alkali soaps, and alkali sulfates and alkali sulfonates of long chain organic compounds form even harder cakes on settling. Also, large amounts of hydrated silica are lost as fines in such processes by failure to be coagulated with the rubber flocs, and remain suspended in the mother liquor of the latex-coagulant mix.

We have found that polyethylene polyamines stabilize the aqueous slurry of hydrated silica particles and give a satisfactory reduction in the settling rate of the silica with prevention of caking. Also, such polyethylene polyamines materially reduce the loss in fines of the hydrated silica, particularly when the synthetic rubber latex-hydrated silica mixture is coagulated with an organic acid.

In carrying out the present invention, the hydrated silica is dispersed in water containing a polyethylene polyamine, and the slurry thus formed is mixed with the synthetic rubber latex and the mixture coagulated in the conventional manner, preferably with an organic acid, such as acetic acid. Examples of polyethylene polyamines that may be used as stabilizers for the aqueous slurry of the hydrated silica are diethylene triamine, triethylene tetramine, tetraethylene pentamine, pentaethylene hexamine, heptaethylene octamine, nonaethylene decamine, and higher polyethylene polyamines. The amount of polyethylene polyamine used in the hydrated silica slurry is preferably from 0.1% to 2% based on the silica, but higher amounts, e. g. up to 5% based on the silica, may be used although no advantage has been found for such higher amounts. All percentages and parts referred to herein are by weight. The concentration of the hydrated silica in the aqueous slurry may be from 5% to 25% concentration. With the higher concentrations, extended wet grinding may be necessary to transform the initial thick paste into a fluid slurry. The preferred concentration of the hydrated silica is 15%, which is a fluid slurry without any grinding. The amount of hydrated silica in the latex-hydrated silica mixture may be from 5 to 100 parts of hydrated silica per 100 parts of synthetic rubber.

The concentration of the synthetic rubber latex may be from 15% to 60% solids. The polymerizable material in the preparation of the synthetic rubber latex may be one or a mixture of butadienes-1,3, for example, butadiene-1,3, methyl-2-butadiene-1,3, (isoprene), chloro-2-butadiene-1,3 (chloroprene), piperylene, 2,3-dimethylbutadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene $(CH_2=C<)$ group which are copolymerizable with butadienes-1,3 are aryl olefines, such as styrene, vinyl naphthylene; alpha methyl styrene, para chloro styrene, dichloro styrene; the alpha methylene carboxylic acids and their esters, nitriles, and amides, such as acrylic acid, methyl acrylate, methyl methacrylate, acrylonitrile, methacrylonitrile, methacrylamide; methyl vinyl ether, methyl vinyl ketone; vinylidene chloride.

The presence of the polyalkylene polyamine stabilizer in the aqueous hydrated-silica slurry gives a slurry that does not settle out too rapidly, and when it does settle a hard cake is not formed so that the silica may be readily redispersed on agitating before mixing the slurry with the synthetic rubber latex. After mixing the hydrated silica slurry with the synthetic rubber latex, the mixture may be coagulated by intimately mixing it with a conventional coagulant bath, preferably an aqueous solution of acid in amount to cause coagulation of the rubber. For minimum loss in fines of the hydrated silica, an organic acid coagulant, such as formic, acetic, or propionic acid should be used. Acetic acid is the present preferred coagulant. The concentration of the organic acid coagulant is not critical and may be from 0.25% to 5%, with about 1% concentration of acid as the optimum coagulant. It is also desirable to add some glue to the acid coagulant which is known to reduce the loss in rubber on coagulating synthetic rubber latices with acids (U. S. patent to Mueller 2,487,263). The glue, when used, may be in a concentration of 0.1% to 1%, and is preferably in a concentration about one-tenth that of the acid.

The following is illustrative of the invention:

An aqueous emulsion of 71 parts of butadiene-1,3 and 29 parts of styrene in 200 parts of water containing 4.7 parts of sodium soap of a mixture of oleic, stearic and palmitic acids (emulsifier), .05 part of sodium salt of condensed alkaryl naphthalene sulfonic acid (stabilizer), 0.15 part of cumene hydroperoxide (catalyst), 0.125 part of diethylene triamine (activator), 0.16 part of tertiary dodecyl mercaptan (modifier), and 0.4 part of potassium chloride (viscosity reducer), was polymerized at 41° F. to 60% conversion, after which unreacted monomers were stripped from the synthetic rubber latex as in conventional practice.

To portions of the above latex at about 25% concentration of synthetic rubber was added aqueous slurries of a finely divided commercial hydrated silica of 15% concentration. The amount of hydrated silica added was 40 parts per 100 parts of synthetic rubber. In some cases the hydrated silica was agitated in water alone to form the slurry, and in other cases 0.5 part of tetraethylene pentamine stabilizer according to the present invention was added to the water before mixing in the hydrated silica. The mixture of latex and hydrated silica was heated to 120° F.

The various batches of latex and hydrated silica thus prepared were coagulated by adding them under mild agitation to various acid coagulant solutions heated to 120° F. As soon as the rubber and hydrated silica had coagulated, the serum was drained off, the coagula crumbs washed with water at 120° F., and the crumbs dried at 125° F. to 250° F. The retention of hydrated silica in the rubber-silica mix, and the loss of hydrated silica as fines in the filtrate and wash water, was calculated in each case.

With water alone to disperse the hydrated silica, and 0.5% concentration of aqueous sulfuric acid containing 0.5% concentration of glue as the coagulant, 78% of the hydrated silica was retained in the rubber-silica mix, giving a 22% loss in fines. With water containing 0.5 part of tetraethylene pentamine based on 100 parts of hydrated silica for dispersing the silica, and with the same sulfuric acid and glue coagulant, the retention of hydrated silica in the rubber-silica mix was 82% giving an 18% loss in fines. Thus the polyethylene polyamine reduced the hydrated silica loss from 22% to 18%.

With water alone to disperse the hydrated silica, and 1% concentration of aqueous acetic acid containing 0.1% concentration of glue as the coagulant, 85% of the hydrated silica was retained in the rubber-silica mix, giving a 15% loss in fines. With water containing 0.5 part of tetraethylene pentamine based on 100 parts of hydrated silica for dispersing the silica, and with the same acetic acid and glue coagulant, the retention of hydrated silica on the rubber-silica mix was 98%, giving only a 2% loss in fines. By the presently preferred embodiment of the present invention using a polyethylene polyamine to stabilize the aqueous slurry of hydrated silica and an acetic acid and glue coagulant for the latex and silica slurry mixture, retention of 95% or more of the hydrated silica may be realized.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The process which comprises mixing with synthetic rubber latex an aqueous dispersion of hydrated silica reinforcing agent containing a polyethylene polyamine, coagulating the mixture, and separating the coagulum thus formed, said synthetic rubber latex being an aqueous emulsion polymerizate of polymerizable material selected from the group consisting of butadienes-1,3 and mixtures of butadienes-1,3 with material which contains a single $CH_2=C<$ bond and is copolymerizable with butadienes-1,3.

2. The process which comprises mixing with a butadiene-styrene copolymer synthetic rubber latex an aqueous dispersion of hydrated silica reinforcing agent containing a polyethylene polyamine, coagulating the mixture, and separating the coagulum thus formed.

3. The process which comprises mixing with synthetic rubber latex an aqueous dispersion of hydrated silica reinforcing agent containing a polyethylene polyamine, coagulating the mixture with an aqueous solution of an organic acid, and separating the coagulum thus formed, said synthetic rubber latex being an aqueous emulsion polymerizate of polymerizable material selected from the group consisting of butadienes-1,3 and mixtures of butadienes-1,3 with material which contains a single $CH_2=C<$ bond and is copolymerizable with butadienes-1,3.

4. The process which comprises mixing with synthetic rubber latex an aqueous dispersion of hydrated silica reinforcing agent containing a polyethylene polyamine, coagulating the mixture with an aqueous solution of acetic acid, and separating the coagulum thus formed, said synthetic rubber latex being an aqueous emulsion polymerizate of polymerizable material selected from the group consisting of butadienes-1,3 and mixtures of butadienes-1,3 with material which contains a single $CH_2=C<$ bond and is copolymerizable with butadienes-1,3.

5. The process which comprises mixing with synthetic rubber latex an aqueous dispersion of hydrated silica reinforcing agent containing a polyethylene polyamine, coagulating the mixture with an aqueous solution of acetic acid containing glue, and separating the coagulum thus formed, said synthetic rubber latex being an aqueous emulsion polymerizate of polymerizable material selected from the group consisting of butadienes-1,3 and mixtures of butadienes-1,3 with material which contains a single $CH_2=C<$ bond and is copolymerizable with butadienes-1,3.

6. The process which comprises mixing with a butadiene-styrene copolymer synthetic rubber latex an aqueous dispersion of hydrated silica reinforcing agent containing a polyethylene polyamine, coagulating the mixture with an aqueous solution of an organic acid, and separating the coagulum thus formed.

7. The process which comprises mixing with a butadiene-styrene copolymer synthetic rubber latex an aqueous dispersion of hydrated silica reinforcing agent containing a polyethylene polyamine, coagulating the mixture with an aqueous solution of acetic acid, and separating the coagulum thus formed.

8. The process which comprises mixing with a butadiene-styrene copolymer synthetic rubber latex an aqueous dispersion of hydrated silica reinforcing agent containing a polyethylene polyamine, coagulating the mixture with an aqueous solution of acetic acid containing glue, and separating the coagulum thus formed.

WILLIAM H. LEUKHARDT, Jr.
  JAMES W. ADAMS.

REFERENCES CITED

The following references are of record in the file of this patent:

UNITED STATES PATENTS

| Number | Name | Date |
|---|---|---|
| 2,576,909 | Adams | Dec. 4, 1951 |